United States Patent [19]
Benson

[11] Patent Number: 5,676,848
[45] Date of Patent: Oct. 14, 1997

[54] METHOD OF SEPARATING EMPLOYING A CONTINUOUS RE-ENTRANT LUMEN WITH WALL CONDITIONING ELEMENTS

[76] Inventor: Robert A. Benson, 13 Commonwealth Ave., Boston, Mass. 02116

[21] Appl. No.: 477,847

[22] Filed: Jun. 7, 1995

Related U.S. Application Data

[63] Continuation-in-part of Ser. No. 190,673, Feb. 2, 1994, Pat. No. 5,427,680, which is a continuation-in-part of Ser. No. 837,487, Feb. 18, 1992, Pat. No. 5,286,376, and Ser. No. 997,283, Dec. 17, 1992, Pat. No. 5,284,581.

[51] Int. Cl.$^6$ ............................................. B01D 37/00
[52] U.S. Cl. ........................... 210/791; 210/194; 210/355; 210/407; 210/413
[58] Field of Search .................................. 210/767, 791, 210/805, 194, 241, 348, 354, 355, 357, 396, 407, 408, 413, 117, 130, 136

[56] References Cited

U.S. PATENT DOCUMENTS

| | | | |
|---|---|---|---|
| 4,267,043 | 5/1981 | Benson | 210/241 |
| 4,328,098 | 5/1982 | Benson | 210/195.1 |
| 5,284,581 | 2/1994 | Benson | 210/194 |
| 5,286,376 | 2/1994 | Benson | 210/194 |
| 5,427,680 | 6/1995 | Benson | 210/194 |

*Primary Examiner*—Robert Popovics

[57] ABSTRACT

Materials including suspended particles are brought together and then separated into two streams one of which only contains the particles, the output streams having different composition from inlet streams. Separation is effected in filtration modules which include a moving runner with wall conditioning elements which dislodge accumulated particles from porous walls of filters.

4 Claims, 4 Drawing Sheets

METHOD OF SEPARATING EMPLOYING A CONTINUOUS RE-ENTRANT LUMEN WITH WALL CONDITIONING ELEMENTS

Cross-Reference to Related Applications

This application is a continuation-in-part of U.S. patent application Ser. No. 08/190673, filed 1994-02-02, now U.S. Pat. No. 5,427,680, which is in turn a continuation-in-part of U.S. patent application Ser. No. 07/837487 filed 1992-02-18 and issuing as U.S. Pat. No. 5286376 and of U.S. patent application Ser. No. 07/997,283 filed 1992-12-17 and issuing as U.S. patent 5,284,581.

BRIEF SUMMARY OF THE INVENTION

This invention relates to methods for processing materials to effect separating of their constituents.

Materials including suspended particles are brought together and then separated into two streams one of which only contains the particles, the output streams having different composition from inlet streams. Separation is effected in filtration modules which include a moving runner with wall conditioning elements which dislodge accumulated particles from porous walls of filters.

DETAILED DESCRIPTION

Figure 1:
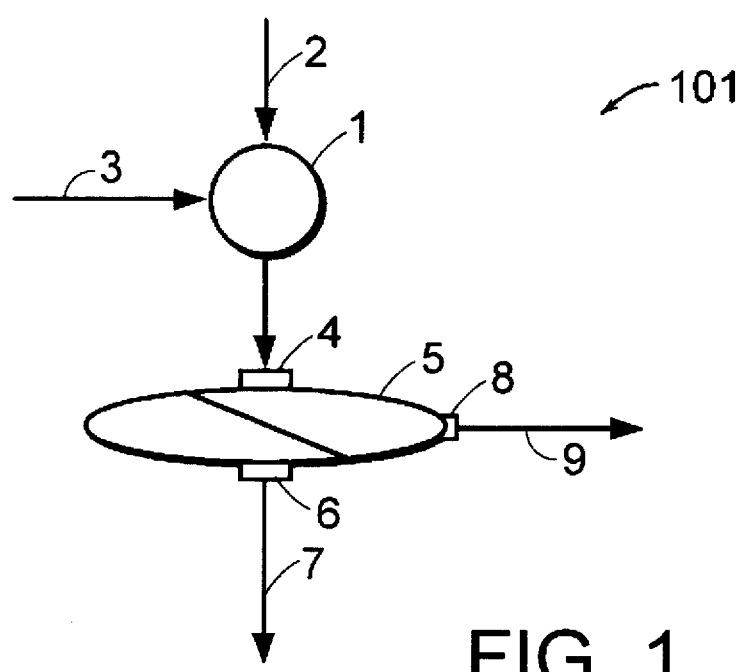
FIG. 1 shows schematically a filtration module used in practicing the invention.
Figure 2:
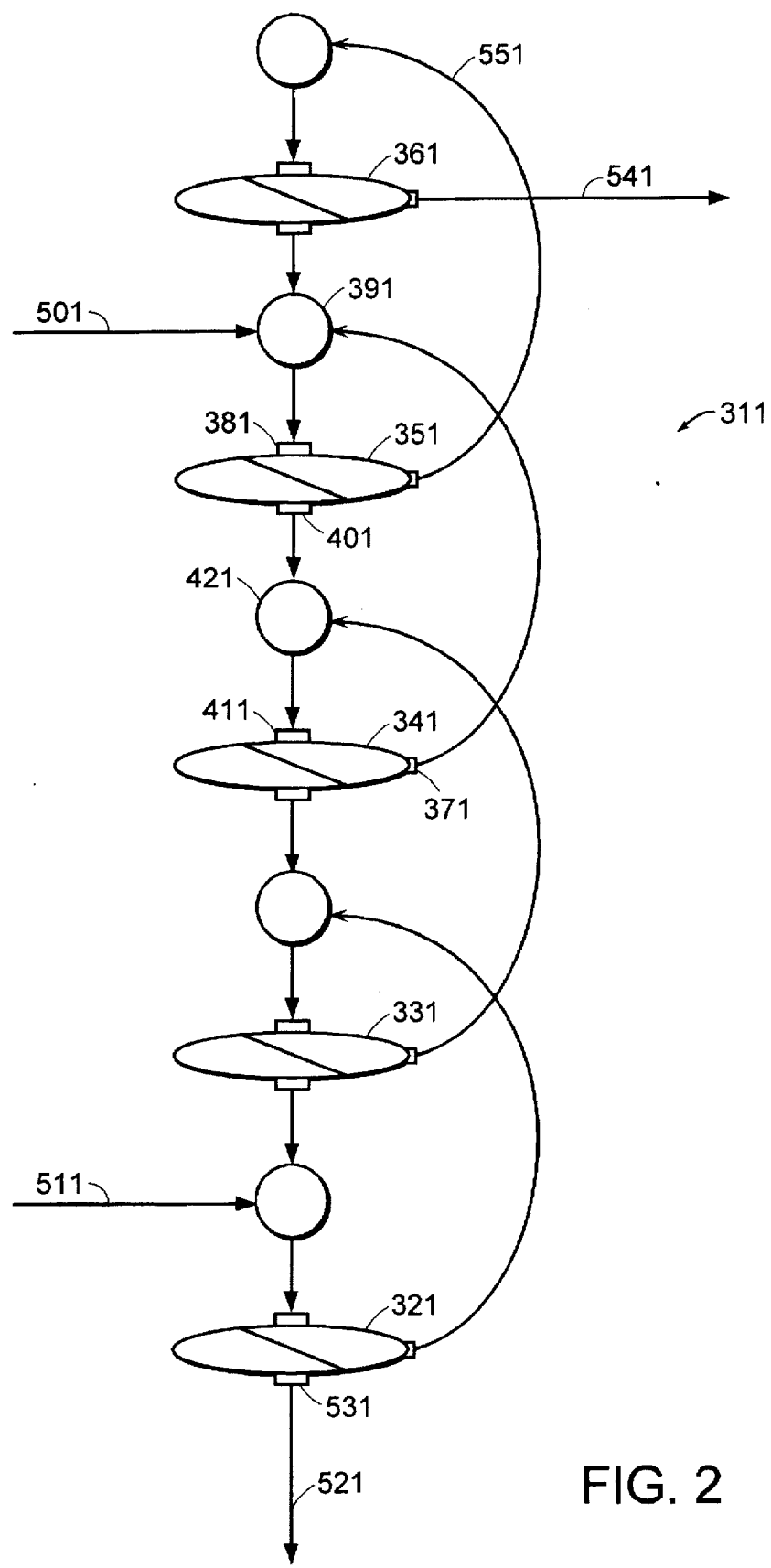
FIG. 2 shows schematically several of the modules of FIG. 1 organized in a ranked sequence and interconnected to form a stack used in practicing the invention.

Apparatus 101 for practice of the invention, as shown in FIG. 1, includes mixing plenum 1 connected to receive a first input stream from first entry 2 and a second input stream from second entry 3. Mixing plenum 1 is connected to discharge into entrance port 4 of filtration module 5. Filtration module 5 includes filtrate discharge port 6 from which a particle-free stream 7 is discharged and particulate discharge port 8 from which a particulate-bearing stream 9 is discharged. Several filtration modules may advantageously be used together to practice the invention as shown in FIG 2. Stack 311 includes a plurality of filtration modules 321, 331, 341, 351, 361 organized in a ranked sequence with each higher ranked module (for example 351) being connected to an adjacent lower ranked module (for example 341) to have the exit port 371 of the lower ranked module discharge through mixing plenum 391 into the entrance port 38 of higher ranked module 351 and to have filtrate discharge port 401 of the higher ranked module discharge through mixing plenum 421 into the entrance port 411 of the lower ranked module.

Stack 311 is connected to first entry 501 on which a first input stream is received, and to second entry 511 on which a second input stream is received. Stack filtrate outlet 521 is connected to receive discharge from filtrate discharge port 531 of lowest ranked module 321. Stack particulate outlet 541 is connected to receive discharge from exit port 551 of highest ranked module 361.

Figure 3:
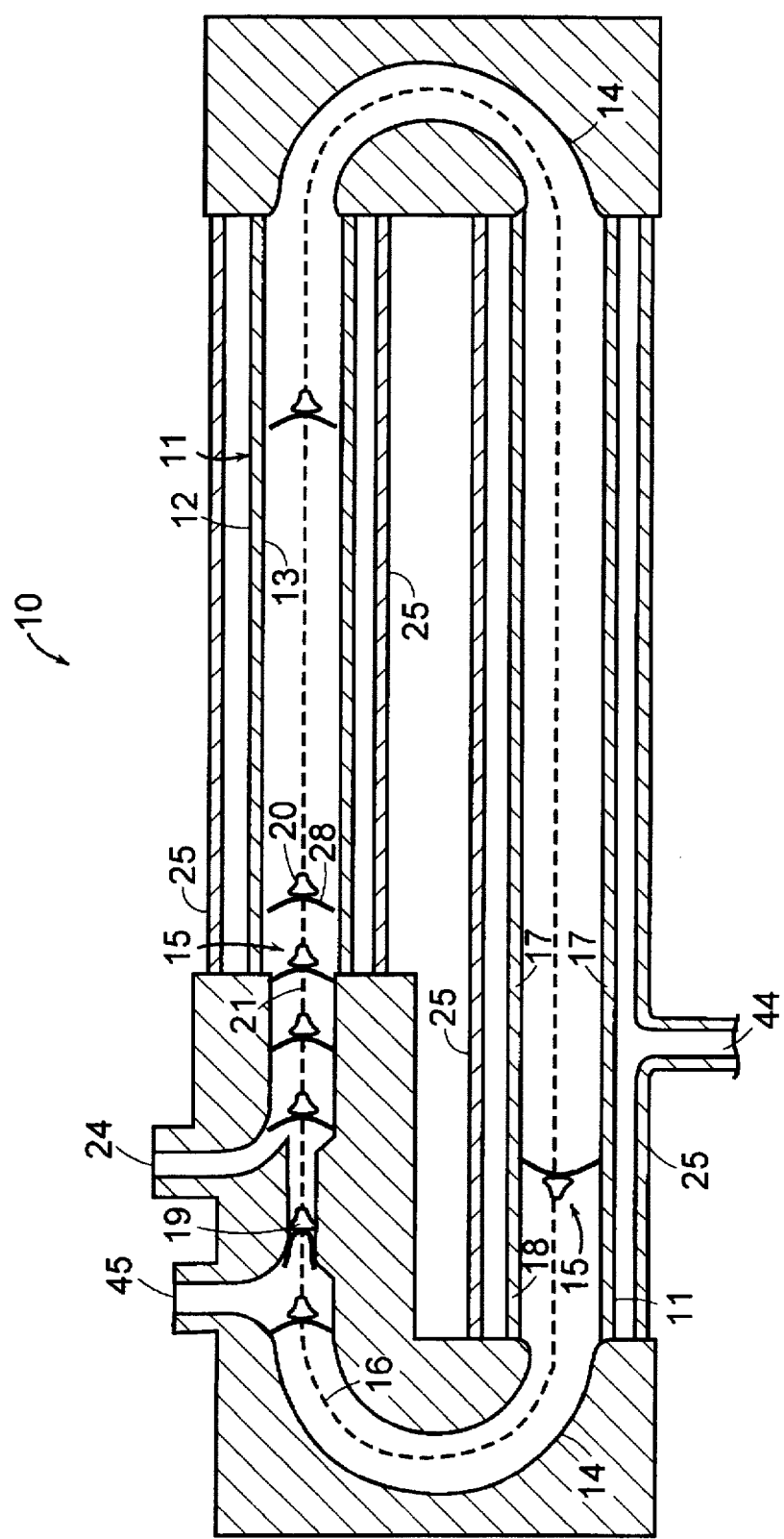
FIG. 3 shows a cross-sectional view of the filtration module of FIG. 1.

As shown particularly in FIG. 3, filtration module 10 as employed in the invention includes tubular structure 11 with wall 12 defining continuous re-entrant lumen 13 in the form of a reentrant, closed loop 14. Portions 17 of wall 12 are porous with pores 18 therethrough. Porous portions 17 are of uniform cross-section. Entrance port 24 communicates with lumen 13, and exit port 45 also communicates with lumen 13. Filtrate discharge port 44 is connected to discharge fluid passing through pores 18 and collected by shell 25. Runner return structure 19 is situated around a portion of lumen 13, and lumen 13 has a reduced cross-section within runner return section 19.

Runner 15, situated within lumen 13, has a generally linear form connected in a closed loop 16 and is free to move with respect to the lumen wall. Runner 15 includes string 21 to which are attached at intervals blocking structures 20 and wall conditioning elements 28. Flow into entrance port 24 drives runner 15 and as runner 15 moves around the circuit of lumen 13 some one of blocking structures is always positioned within runner return structure to block flow from entrance port 24 to exit port 45.

Further details of the filtration module of FIG. 3 are given in U.S. Pat. No. 5286376; , which is incorporated herein by reference.

Figure 4:
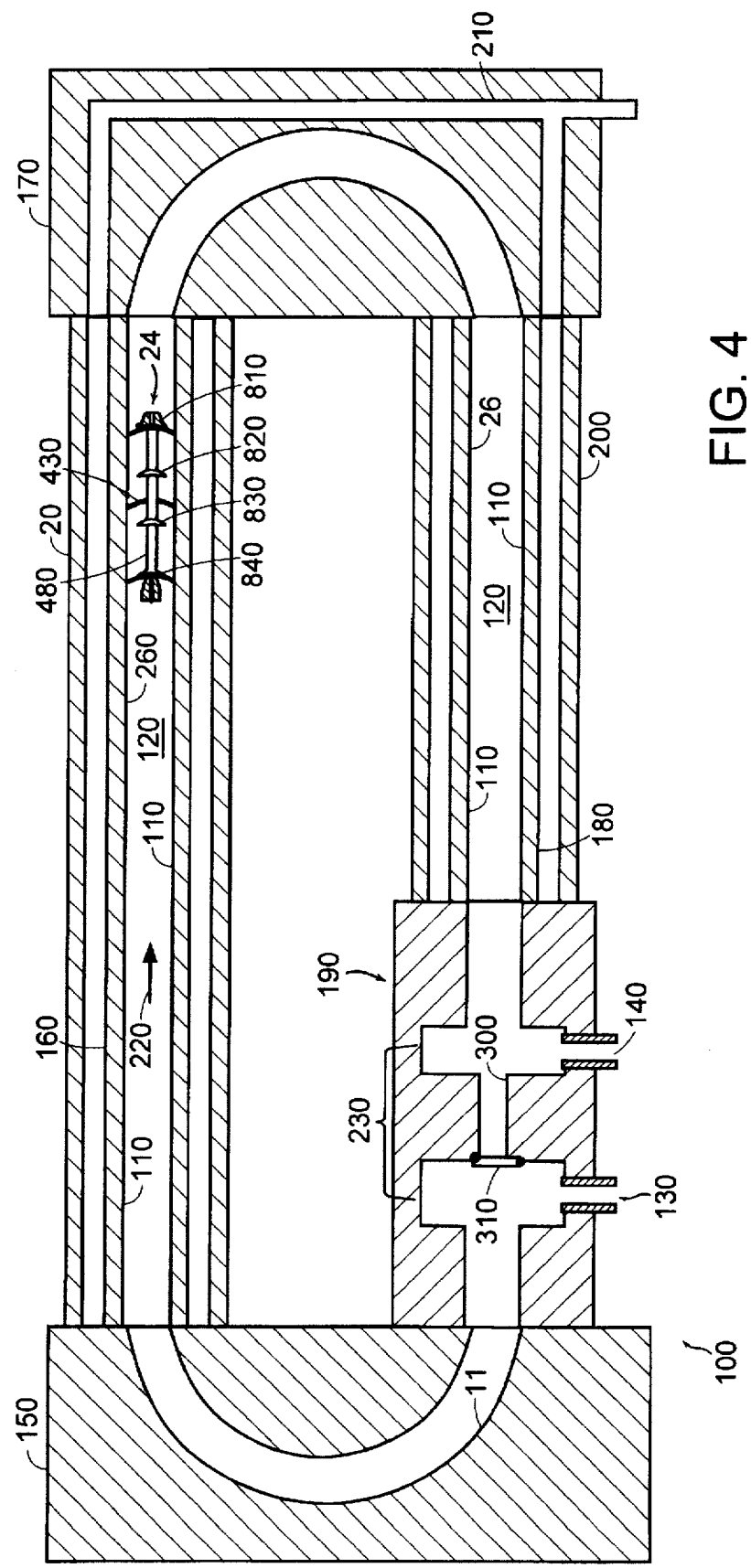
FIG. 4 shows a cross-sectional view of an alternative version of the filtration module of FIG. 3.

Alternative filtration module 100, shown in FIG. 4, includes wall structure 110 which defines continuous reentrant lumen 120. Entrance port 130 communicates with lumen 120 as does exit port 140. A first, longer path 220 through lumen 120 from entrance port 130 to exit port 140 is defined passing through turning structure 150, upper porous wall tube 160, turning structure 170, and lower porous wall tube 180 A second, shorter path 230 through lumen 120 from entrance port 130 to exit port 140 is also defined passing only through runner return section 190. Filtrate containment tubes 200 capture filtrate which has passed through porous wall tubes 160, 180. Filtrate discharge port 210 communicates with the interior of containment tubes 200 and provides for the discharge of filtrate.

Runner return structure 190 has a reduced portion 300 in which the cross-section of the lumen is less than in the first path 220, the lumen with the reduced cross-section being in second path 230. The runner return structure also includes a blocking mechanism such as check valve 310 which blocks flow from entrance port 130 to exit port 140 through runner return structure 230.

Runner 240 is situated within lumen 120 and is free to move independently around the circuit of lumen 130. Runner 240, has an elongated form and includes wall conditioning element such as brush 430 and blocking elements 810, 820, 830, and 840 all affixed on flexible spine 480 running the length of the runner. Flow into entrance port 130 drives runner 240 around the lumen and as runner 240 moves conditioning elements dislodge material accumulated on the porous wall.

Further details of the filtration module of FIG. 4 are given in U.S. patent application Ser. No. 08/190673, which is incorporated herein by reference.

Using apparatus as described above the invention may be practiced as follows.

With reference to the apparatus of FIG. 1, fluid with a mix of a first and a second component is introduced into entry 2, and particles having a greater affinity for the second component than for the first are introduced into entry 3. A stream is withdrawn from filtrate discharge port 6 which is free of particles and is enriched in first component as compared to fluid introduced into entry 2. A fluid enriched in the second component and carrying the particles suspended therein is withdrawn from particulate discharge port 8.

The particles to be introduced would be chosen with reference to the components to obtain differential affinity according to principles well understood. Choices would include particles with surface selectively adsorbing polarizable or non-polarizing material, activated charcoal selectively adsorbing higher molecular weight components and organic macromolecules with specific binding sites for one of the components.

Practice of the invention using the stack of FIG. 2 is essentially as described above except that the refluxed multiple stages of the FIG. 2 apparatus enable an effective separation with particles having only a slight differential affinity for the two components.

In a further example of practicing the invention using the apparatus of FIG. 1, a slurry or sludge of solid particles wet with water or other volitile fluid is introduced into entry 2. A stream of dry air or other gas is introduced into entry 3. After mixing of the input streams, most or all of the water of the sludge will be vaporized and the solids will be fluidized in an air-water vapor mix, mostly air. Most of the air and most of the vapor will pass through the porous wall and out through the filtrate discharge port. Dry solid fluidized with a small quantity of the air-vapor mix will be withdrawn from the particulate discharge port.

I claim:

1. A method for separating comprising the steps: providing a filtration module comprising:

structure defining a continuous re-entrant lumen, said lumen having a wall, said lumen wall having porous portions with pores therethrough, said lumen within said porous portions being of uniform cross-section, an entrance port in fluid communication with said lumen and an exit port in fluid communication with said lumen, a filtrate discharge port connected to discharge fluid passing through said pores, a runner return structure situated around a portion of said lumen, a blocking mechanism effective in blocking flow from said entrance port to said exit port through said runner return structure, a runner situated within said lumen and free to move with respect to the lumen wall, said runner moving along said lumen when fluid is introduced through said entrance port, said runner including wall conditioning elements effective when the runner moves along said lumen to dislodge accumulated solids from said porous portions of wall, said filtration module being connected to a first entry to receive a first input stream and connected to a second entry to receive a second input stream, introducing into said first entry fluid with a mix of a first component and a second component, introducing into said second entry particles having greater affinity for said second than for said first component, and drawing off from said filtrate discharge port fluid with a fraction of said first component greater than the fraction of the first component in the fluid introduced in said first entry and free of particles.

2. A method for separating comprising the steps:

providing a filtration module comprising:

structure defining a continuous re-entrant lumen, said lumen having a wall, said lumen wall having porous portions with pores therethrough, said lumen within said porous portions being of uniform cross-section, an entrance port in fluid communication with said lumen and an exit port in fluid communication with said lumen, a filtrate discharge port connected to discharge fluid passing through said pores, a runner return structure situated around a portion of said lumen, a blocking mechanism effective in blocking flow from said entrance port to said exit port through said runner return structure, a runner situated within said lumen and free to move with respect to the lumen wall, said runner moving along said lumen when fluid is introduced through said entrance port, said runner including wall conditioning elements effective when the runner moves along said lumen to dislodge accumulated solids from said porous portions of wall, said filtration module being connected to a first entry to receive a first input stream and connected to a second entry to receive a second input stream, introducing into said first entry fluid with a composition including a first fluid component and having particles fluidized therein, introducing into said second entry fluid with a composition different from that of the fluid introduced into said first entry, and drawing off from said filtrate discharge port fluid containing over half of the first fluid component introduced and free of particles.

3. A method for separating comprising the steps:

providing a filtration module comprising:

structure defining a continuous re-entrant lumen, said lumen having a wall, said lumen wall having porous portions with pores therethrough, said lumen within said porous portions being of uniform cross-section, an entrance port in fluid communication with said lumen and an exit port in fluid communication with said lumen, a filtrate discharge port connected to discharge fluid passing through said pores, a runner return structure situated around a portion of said lumen, a blocking mechanism effective in blocking flow from said entrance port to said exit port through said runner return structure, a runner situated within said lumen and free to move with respect to the lumen wall, said runner moving along said lumen when fluid is introduced through said entrance port, said runner including wall conditioning elements effective when the runner moves along said lumen to dislodge accumulated solids from said porous portions of wall, said filtration module being connected to a first entry to receive a first input stream and connected to a second entry to receive a second input stream, introducing into said first entry a first fluid and introducing in said second entry a second fluid different from said first fluid, at least one of said first and second fluids having particles fluidized therein, and drawing off from said filtrate discharge port fluid free of particles.

4. A method of separating comprising the steps:

providing a stack comprising a plurality of filtration modules, each module including structure defining a continuous re-entrant lumen, said lumen having a wall, said lumen wall having porous portions with pores therethrough, said lumen within said porous portions being of uniform cross-section, an entrance port in fluid communication with said lumen and an exit port in fluid communication with said lumen, a filtrate discharge port connected to discharge fluid passing through said pores, a runner return structure situated around a portion of said lumen, a blocking mechanism effective in blocking flow from said entrance port to said exit port through said runner return structure, a runner situated within said lumen and free to move with respect to the lumen wall, said runner moving along said lumen when fluid is introduced through said entrance port, said runner including wall conditioning elements effective when the runner moves along said lumen to dislodge accumulated solids from said porous portions of wall, modules of said stack being organized in a ranked sequence, a module of a higher rank being connected to an adjacently ranked module of a lower rank so as to have the exit port of the lower ranked module connected to discharge into the entrance port of the higher ranked module and the filtrate discharge port of the higher ranked module connected to discharge into the entrance port of the lower ranked module, said stack being connected to a first entry to receive a first input stream and connected to a second entry to receive a second input stream, introducing into said first entry fluid with a mix of a first component and a second component, introducing into said second entry particles having greater affinity for said second than for said first component, and drawing off from the filtrate discharge port of the lowest ranked of said modules fluid with a fraction of said first component greater than the fraction of the first component of the fluid introduced into said first entry and free of particles.

* * * * *